Figure 3:
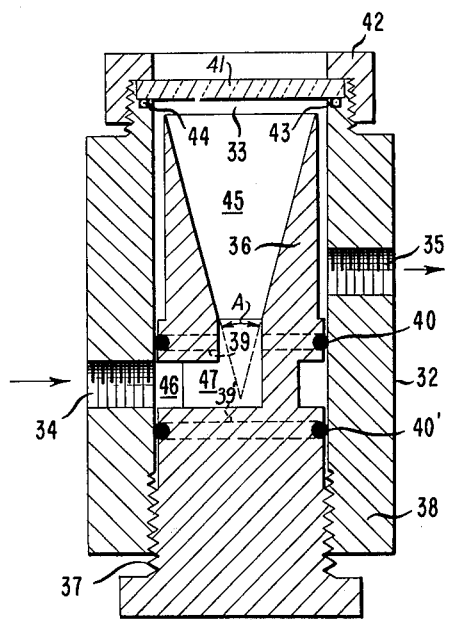

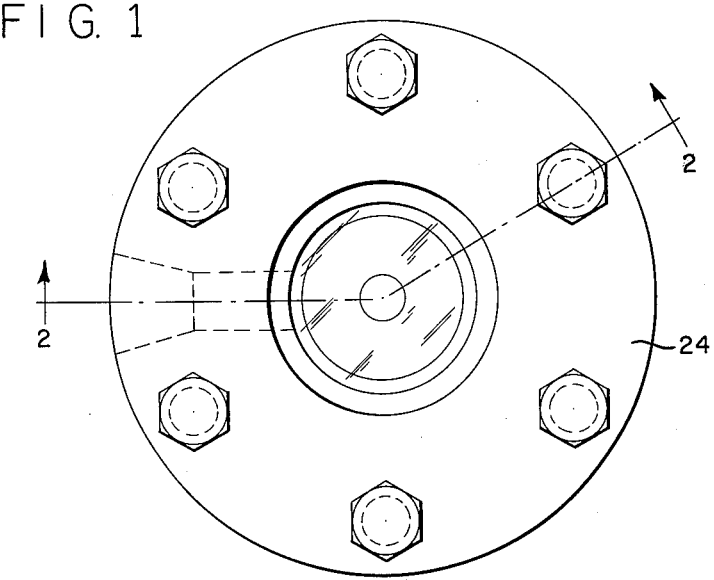
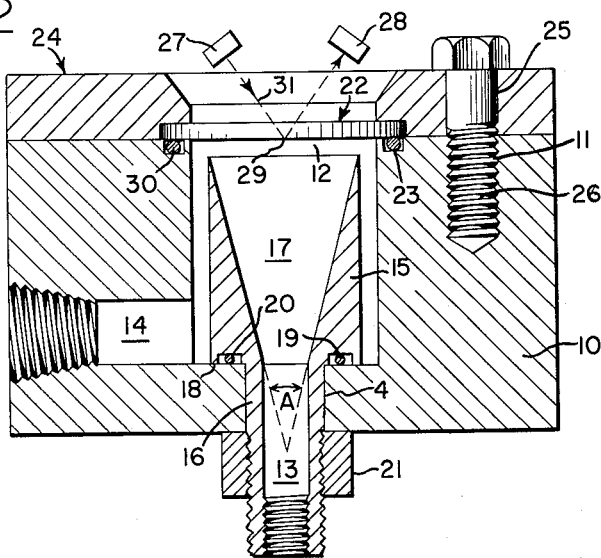

Feb. 13, 1962  A. H. McKINNEY ETAL  3,020,795
FLUID INSPECTION APPARATUS
Filed May 14, 1959  2 Sheets-Sheet 2

INVENTORS
ALFRED H. McKINNEY
CHARLES D. REILLY

BY [signature]

ATTORNEY

3,020,795
FLUID INSPECTION APPARATUS
Alfred H. McKinney, Chester, Pa., and Charles D. Reilly, Wilmington, Del., assignors to E. I. du Pont de Nemours and Company, Wilmington, Del., a corporation of Delaware
Filed May 14, 1959, Ser. No. 813,275
4 Claims. (Cl. 88—14)

The present invention relates to the inspection and analysis for fluid streams. More particularly, the invention relates to apparatus which utilizes reflected light in analyzing properties of a flowing fluid wherein the fluid is constrained to a particular flow pattern.

In many chemical processes, analysis of a fluid stream by spectrometric, colorimetric, or potentiometric procedures provides a simple and reliable means for monitoring process variables and product quality. Those methods which provide for continuous analysis of the stream are particularly desirable. Heretofore, providing a sufficient depth of material as well as eliminating reflections from the container walls has been a problem in methods which utilize reflected light measurements. In addition, the use of an ordinary sight glass or porthole in a pipeline has not proved to be satisfactory, particularly when the fluids are viscous or have laminar flow patterns. For example, the slower velocity of the fluid contiguous to the wall of the pipeline and the porthole has generally resulted in sediment being deposited on the glass. Accuracy of analysis has also been adversely affected by a settling away from the wall of particles in fluid suspensions, the precipitation of solute in saturated solutions, and changes in chemical composition within the fluid stream. In reflectance measurements of some highly opaque, viscous fluds, the relatively stagnant layers under the sight window has rendered analysis of the flowing stream very difficult or impossible.

It is, therefore, an object of this invention to provide an improved apparatus for optical analysis of a fluid stream. Another object of this invention is to provide apparatus for continuous measurement of the color and other properties by measuring light reflected from viscous fluids. A further object of this invention is to provide apparatus which can be readily modified to permit accurate analysis of fluids of varying opacity. A still further object of this invention is to provide apparatus which will withstand high pressures encountered in viscous fluid streams.

The manner in which these and other objects of this invention are attained will become apparent from the following detailed description and the accompanying drawings, in which, FIGURE 1 is a top view of one embodiment of the apparatus of this invention; and FIGURE 2 is a cross-sectional view taken along line 2—2 of FIGURE 1 showing one arrangement of apparatus for inspecting the fluid stream;

FIGURE 3 is a cross-sectional view of a preferred embodiment of the apparatus of this invention.

In general, the apparatus of this invention comprises a rigid housing provided with a cavity therein which is closed at one end by a light-transmitting window. An insert member having a passage of increasing diameter is positioned inside the cavity opposite the window and in communication with a fluid inlet. The dimensions of the insert member are such that a distributive radial flow pattern of the fluid stream appears at the window. The insert member is spaced from the window and the side walls of the recess to provide for lateral passage of the fluid from the window and a downward passage along the walls of the cavity to an outlet which is located at the base of the insert member. A light-transmitting device and a radiation detector are positioned above the window.

Referring to FIGS. 1 and 2, which illustrate one embodiment of this invention, reference numeral 10 designates a housing which is provided with a cavity 12, an inlet 13, an outlet 14, and a plurality of threaded holes 11, only one of which is shown for purposes of clarity. Inlet 13 is adapted to receive insert member 15 which is positioned within cavity 12. Insert member 15 is provided with a stem pipe 16 and a tapered passage 17. The base 18 of insert member 15 is provided with an annular recess 19 for receiving a sealing member 20. Stem pipe 16, which depends from insert member 15, is threaded to receive locking nut 21. A circular window 22 is centrally positioned above insert member 15. Housing 10 is provided with an annular recess 23 adjacent to recess 12 for receiving a sealing member 30. Window 22 is secured in position by locking ring 24 which is provided with holes 25 for receiving gathering bolts 26. Light source 27 is positioned above window 22 for directing a calibrated beam toward window 22. A detector 28 for receiving and evaluating light reflected from the surface 29 of the fluid in recess 12 is positioned adjacent to light source 27.

In operation, a fluid containing light-reflecting particles enters stem pipe 16, travels through tapered passage 17, and impinges on window 22. The fluid travels outwardly across the window beyond the edge of insert 15, whereupon it travels downwardly through the space between insert 15 and housing 10. The fluid leaves through outlet 14. As the fluid travels through the apparatus, a calibrated beam 31 is directed from light source 27 into the fluid through window 22. The reflected light from the surface 29 of the fluid to a depth limited by the opacity of the fluid is collected by detector 28.

In the preferred embodiment of this invention which is shown in FIG. 3, reference numeral 32 designates a housing which is provided with a cavity 33, an inlet 34, and an outlet 35. An insert member 36 is adjustably positioned within cavity 33. The base of insert member 36 is provided with a threaded portion 37 which mates with the threaded portion 38 of housing 32. Insert member 36 is also provided with annular recesses 39 and 39'. The recesses are adapted to receive sealing members 40 and 40' and are so positioned that a liquid seal is provided on either side of inlet 34. Housing 32 is adapted to receive a window 41 which is secured in position by locking ring 42 and is provided with a recess 43 adjacent to window 41 for receiving a sealing member 44. Insert member 36, centrally located within cavity 33, is positioned adjacent to window 41 with the portion of tapered passage 45 of greatest diameter adjacent to the window. Insert member 36 is provided with an annular passage 46 and an orifice 47 which are in communication with inlet 34 and tapered passage 45. Suitable inspection means as previously described may be positioned above window 41.

In the inspection of the fluid stream, the amount of light reflected may be continuously recorded by known recording devices such as potentiometers and the like which are actuated by the amplification of electrical impulses from the detector. Various reflectance type apparatus such as colorimeters and color comparators which are designed for continuous or intermittent use may be used in conjunction with the detecting device. The apparatus of this invention is particularly suitable for use with a spectrophotometer.

The apparatus of this invention is capable of various modifications. Depending on the fluid which is being analyzed, tapered chambers 17 and 36 may be conical, concave, or convex. The amount of taper as measured by angle A can be regulated to provide deep penetration of the light into the fluid sample, which is preferred with relatively clear fluids, or a taper approaching 180° may be used in the case of relatively opaque fluids. The length of the passage may also be varied, and as shown in the preferred embodiment the space between the window and the tapered passage may be varied.

The materials used in constructing the housing, insert member, and other parts with which the fluid comes in contact should be selected from those which are chemically resistant to the fluid and capable of withstanding pressures associated with the transmission of the fluid. Windows 22 and 41 may be constructed of glass, sapphire, or other suitable light-transmitting material which possesses adequate strength. The sealing members are preferably selected from a deformable material which is not chemically affected by the fluid.

Many advantages accrue from the apparatus of this invention. The fluid path provided by this apparatus gives a continuous flushing action on the window which substantially eliminates accumulation of material which would interfere with light reflectance and lead to inaccuracies in the analysis of the fluid. In addition, any laminar flow which might occur in the passage does not affect the readings obtained since this portion of the stream does not participate to an appreciable degree in reflecting light. The apparatus of this invention may also be readily disassembled for cleaning and maintenance.

It will be apparent that many widely different embodiments of this invention may be made without departing from the spirit and scope thereof, and therefore, it is not intended to be limited except as indicated in the appended claims.

We claim:

1. Apparatus for inspection of a fluid stream comprising a housing having a cavity therein, a light-transmitting window enclosing one end of said cavity, an insert member having a fluid passage of increasing diameter positioned within said cavity, a fluid inlet in communication with said fluid passage, sealing means within said cavity for providing a fluid tight chamber surrounding said insert member, and a fluid outlet in said housing in communication with said fluid chamber, said insert member being positioned in spaced relationship to said window with the portion of said fluid passage of greatest diameter terminating adjacent to said window thereby providing radial flow of a fluid across said window.

2. The apparatus of claim 1 wherein said cavity and said insert member are cylindrical in shape.

3. The apparatus of claim 2 wherein said fluid passage of increasing diameter is conical in shape.

4. Apparatus for inspection of a fluid stream comprising a housing having a cavity therein, a light-transmitting window enclosing one end of said cavity, an insert member having a fluid passage of increasing diameter positioned within said cavity, a fluid inlet in communication with said fluid passage, sealing means within said cavity for providing a fluid tight chamber surrounding said insert member, a fluid outlet in said housing in communication with said fluid chamber, said insert member being spaced apart from said window to provide radial flow of a fluid across said window, and adjusting means for varying the spacing between said insert member and said window.

References Cited in the file of this patent

UNITED STATES PATENTS

| | | |
|---|---|---|
| 1,937,721 | Simon et al. | Dec. 5, 1933 |
| 1,937,722 | Simon et al. | Dec. 5, 1933 |
| 1,969,626 | Simon et al. | Aug. 7, 1934 |
| 2,460,836 | Lovins | Feb. 8, 1949 |
| 2,775,159 | Frommer | Dec. 25, 1956 |
| 2,873,644 | Kremen et al. | Feb. 17, 1959 |
| 2,935,909 | Mathiesen | May 10, 1960 |
| 2,966,092 | Hartridge | Dec. 27, 1960 |